July 19, 1966      J. C. THORESEN      3,262,034

PROPORTIONAL SPEED FLOATING CONTROLLER

Filed June 7, 1963

INVENTOR
JOHN C. THORESEN

BY *Dodge and Sons*

ATTORNEYS

United States Patent Office 3,262,034
Patented July 19, 1966

3,262,034
PROPORTIONAL SPEED FLOATING CONTROLLER
John C. Thoresen, Warwick, R.I., assignor to The New York Air Brake Company, a corporation of New Jersey
Filed June 7, 1963, Ser. No. 286,274
6 Claims. (Cl. 318—18)

This invention relates to electric controllers, and is primarily concerned with controllers of the proportional speed floating type.

As is known in the art, these controllers include a final control element which is movable in opposite directions to vary in reverse senses the variable which is being controlled. This final control element is positioned by an operator that is actuated by controlling means which includes a device for generating a reference signal corresponding to the desired value of the controlled variable, and a feedback device for generating a signal corresponding to the actual value of said variable. These two signals are compared to obtain an actuating or error signal which initiates corrective action. In controllers of this kind, the controlling means regulates the floating speed of the final control element so that at any instant that speed is proportional to the magnitude of the actuating error signal.

The object of this invention is to provide an improved proportional speed floating controller which utilizes, as far as possible, electrical and electronic logic circuits employing solid state control elements, and which features a high gain stable amplifier for operator control, a unique floating rate feedback with adjustable gain, and improved circuitry for permitting accurate measurements of both the reference signal and the feedback signal corresponding to the actual value of the controlled variable.

The preferred embodiment of the invention is employed to control the rate of flow of fluid through a conduit and is described herein with reference to the accompanying drawing whose single figure is a schematic circuit diagram of the complete controller.

As shown in the drawing, the controller is arranged to maintain a predetermined, but selectively variable, rate of flow of fluid through a pipe 1. The final control element is a throttle valve 2 which is positioned by a double-acting piston motor 3 whose opposed working chambers 4 and 5 are connected with the motor ports 6 and 7 of a hydraulic pilot valve 8 through conduits 9 and 11, respectively. The pilot valve receives fluid under pressure from a supply pump 12 which is connected with inlet port 13, and is provided with a pair of exhaust ports 14 and 15 which are connected with a reservoir 16. Communication between the ports is controlled by a sliding valve plunger 17 formed with an annular groove 18 and a pair of lands 19 and 21. When valve plunger 17 is in the illustrated neutral position, lands 19 and 21 block motor ports 6 and 7, respectively, and double-acting motor 3 is hydraulically locked. Upward movement of valve plunger 17 causes groove 18 to interconnect ports 7 and 13 and allows ports 6 and 14 to communicate across the lower peripheral edge of land 21. Therefore, movement of the pilot valve in this direction causes motor 3 to close throttle valve 2. Movement of valve plunger 17 in the downward direction causes groove 18 to interconnect ports 6 and 13 and allows ports 7 and 15 to communicate across the upper peripheral edge of land 19, so this action causes motor 3 to open valve 2. It will be apparent that as valve plunger 17 moves away from neutral position in either direction it graduates the flows through ports 6 and 7, and that, therefore, the speed at which motor 3 moves the valve 2 depends upon the magnitude of the displacement of plunger 17 from the neutral position.

Valve plunger 17 is positioned by a shaded pole A.C. motor 22 with which it is connected by a suitable drive connection 23 including a gear train (not shown), and a pair of limit stops 24 and 25. The primary coil 26 of motor 22 is connected with the A.C. supply lines 27 and 28 and the secondary coils 29 and 29' are connected across the input junctions 32 and 33 and 32' and 33' of bridge rectifiers 34 and 34', respectively. The output junctions 35 and 36 of bridge 34 are connected with the anode and cathode 37 and 38, respectively, of a silicon-controlled rectifier (hereinafter termed SCR) 39. The gate electrode 41 of SCR 39 is connected with the center tap of a transformer 42 employed in a full-wave rectifier 43 whose output side is connected with cathode 38. The bridge 34' is connected with a similar circuit employing SCR 39' and full-wave rectifier 43. Normally, the voltages impressed across the input junctions of rectifiers 34 and 34' are not sufficient to cause the SCRs 39 and 39' to be conductive, and therefore, motor 22 is at rest. As described below, the SCRs 39 and 39' are rendered conductive, and thus short circuit secondary coils 29 and 29', in response to gating pulses applied to the gate electrodes 41 and 41' respectively.

The primary windings 44 and 44' of transformers 42 and 42', respectively, are connected across the A.C. supply lines 27 and 28 in circuits controlled by an error detector 45. The error detector 45 is a galvanometer having input terminals 46 and 47 and a movable pointer 48 that carries a light shield 49 which is interposed between a lamp 51 and a pair of photo-resistive cells 52 and 52'. The motion of pointer 48 is restricted so that large voltage drops across terminals 46 and 47 will not damage the instrument. When the voltages at terminals 46 and 47 are equal, pointer 48 assumes the illustrated neutral position in which shield 49 prevents illumination of both of the cells 52 and 52', but when the voltages are unbalanced in one direction or the other, pointer 48 swings either to the left or the right and uncovers one of the cells. The illumination of a cell greatly reduces its electrical resistance and causes a substantial current to flow in the circuit in which it is contained. As shown, cell 52 is connected in series with primary winding 44 and cell 52' is connected in series with primary winding 44'. For purposes of discussion, it is assumed herein that when the voltage at terminal 46 is higher than the voltage at terminal 47, pointer 48 swings to the right and uncovers cell 52, thereby energizing transformer 42. Furthermore, it is assumed that energization of this transformer causes motor 22 to move valve plunger 17 of pilot valve 8 downward.

The input terminal 46 of error detector 45 is connected with the output of a reference voltage generator 53 including a constant D.C. voltage source 54 supplied from the A.C. lines 27 and 28 and a potentiometer 55 whose winding 56 is connected across the source and whose wiper 57 is connected through a lead 58, with the terminal 46. The return path for generator 53 includes lead 59, resistor 61 and a portion of the feedback signal circuit described below. Connected across leads 58 and 59 is a voltmeter 62 which indicates the magnitude of the reference voltage applied to the error detector and is calibrated in terms of flow rate. A one-way current flow device 63, which will be referred to by the generic term "rectifier," is interposed in lead 58 between terminal 46 and the voltmeter connection in order to isolate the voltmeter from the feedback signal circuit and permit a true indication of reference voltage.

The feedback signal circuit employed in this controller includes two voltage generators whose combined outputs are applied to terminal 47 in opposition to the reference voltage applied to terminal 46. The first of these feedback generators responds to the rate of flow through pipe 1 and comprises a differential transformer 64 having a primary winding energized by a conventional constant voltage transformer 65 which receives its power from A.C. lines 27 and 28, a pair of secondary windings 66 and 67 connected in series opposition, and a movable core 68. The core 68 is actuated by a pressure responsive diaphragm 69 whose opposite sides are connected by conduits 72 and 73 with the entrance and throat, respectively, of a Venturi flow meter 71 located in pipe 1. When the rate of flow through pipe 1 is zero, core 68 assumes a neutral or mid position and consequently, no voltage appears across the secondary windings 66 and 67.

The opposite ends of the interconnected secondary windings 66 and 67 are connected with the input junctions 74 and 75 of a bridge rectifier 76. Output junction 77 of bridge 76 is connected with terminal 46 of error detector 45 through lead 59 and resistor 82, and output junction 78 is connected with terminal 47 through lead 79 and the second feedback signal generator 81. The output of bridge 76 is smoothed by a capacitor 83 and is measured and recorded by a recording voltmeter 84. A one-way current flow device or rectifier 85 is interposed in lead 79 to isolate voltmeter 84 from the input circuit in the same way rectifier 63 isolates voltmeter 62 from the feedback circuit. The inclusion of this rectifier enables meter 84 to make continuous true recordings of actual flow rate.

The second feedback signal generator 81 produces a voltage whose magnitude is proportional to the rate of movement of throttle valve 2 and whose polarity depends upon the direction in which that valve is moving. This generator comprises a potentiometer 86 having a winding 87 connected across the center tapped secondary of a stepdown transformer 88 and a wiper 89 driven by motor 22 and connected with terminal 47 of the error detector 45. The center tap of transformer 88 is connected with lead 79. The connections between potentiometer winding 87 and the secondary winding of the transformer 88 contain a pair of reversely set rectifiers 91 and 92 so that as wiper 89 moves in opposite directions from the mid position it produces positive and negative feedback voltages, respectively. The primary winding of transformer 88 is energized by power supplied from the A.C. lines 27 and 28 through a circuit including adjustable resistor 93. This resistor 93 is a sensitivity control and permits the rate of change of the voltage output of potentiometer 86 with respect to wiper movement to be varied as required to suit the overall response time of the controller. Thus, maximum response speed can be had without impairing controller stability.

*Operation*

When the controller is in balance, the voltages applied to terminals 46 and 47 are equal, motor 22 is at rest, pointer 48 of the error detector 45, valve plunger 17 of pilot valve 8, and the wiper 89 of potentiometer 86 are in their neutral positions, and the core 68 of differential transformer 64 is in a position corresponding to the present value of the reference input.

If it is desired to increase the rate of flow through pipe 1 to a higher level, the operator moves wiper 57 of input potentiometer 55 to increase the voltage applied to terminal 46 of error detector 45. In response to the voltage unbalance across terminals 46 and 47, pointer 48 swings to the right and causes shield 49 to uncover photoresistive cell 52. As a result, transformer 42 is energized and the full-wave rectifier 43 commences to apply pulses to the gate 41 of SCR 39 which are of sufficient magnitude to turn on the SCR and render it conductive. The gate pulses are in phase with the output pulses from rectifier bridge 34 because both the primary winding 44 of transformer 42 and the primary coil 26 of motor 22 are supplied from A.C. lines 27 and 28. Therefore, the SCR 39 becomes conductive at the instant a pulse arrives at anode 37 from the output junction 35 of bridge 34, and the secondary coil 29 of motor 22 is, in effect, short circuited. Once a pulse passes through SCR 39, the potential drop across anode and cathode 37 and 38, respectively, decreases to a value insufficient to maintain the SCR conductive and the SCR turns off. However, when the next pulse is applied to the gate electrode 41 the SCR again becomes conductive and passes another output pulse from junction 35 to junction 36. As long as cell 52 remains illuminated, and transformer 42 remains energized, the SCR 39 continues to cycle on and off at a frequency equal to the frequency of the A.C. supply. Consequently, motor 22 continues to run as long as the error detector 45 senses an error signal.

As motor 22 rotates, it moves valve plunger 17 downward and thereby causes annular groove 18 to interconnect ports 6 and 13 and allows ports 7 and 15 to communicate across the upper peripheral edge of land 19. This movement of valve plunger 17 opens a supply path from pump 12 to working chamber 4 and an exhaust path from working chamber 5 to reservoir 16, so double-acting motor 3 commences to move throttle valve 2 in the opening direction. Simultaneously, motor 22 drives wiper 89 of potentiometer 86 away from its neutral position to thereby increase the feedback voltage already being applied to terminal 47 of error detector 45 by the differential transformer 64. When the voltages at terminals 46 and 47 are again balanced, pointer 48 moves back to its illustrated neutral position and interrupts the light path between lamp 51 and cell 52. Consequently, transformer 42 is de-energized, SCR 39 ceases to cycle on and off, and the current flow through secondary coil 29 ceases. As a result, motor 22 comes to rest. The rate at which double-acting motor 3 moves valve 2 depends upon the distance motor 22 has moved valve plunger 17 from its neutral position because of the throttling action at ports 6 and 7.

As valve 2 opens, the flow rate through pipe 1 commences to increase and diaphragm 69 begins to move core 68 upward to thereby increase the feedback voltage output from bridge 76. The change in this feedback voltage unbalances the voltage across error detector 45 in the opposite sense and causes pointer 48 to swing to the left and uncover cell 52'. This action energizes transformer 42' and turns on SCR 39', thereby short circuiting secondary coil 29' and causing motor 22 to rotate in the opposite direction and drive valve plunger 17 back toward the neutral position. As a result, the throttling action at ports 6 and 7 is increased and motor 3 slows down. This movement of motor 22 also shifts wiper 89 toward its neutral position thereby decreasing the feedback voltage generated by potentiometer 86. When the decrease in the voltage output of potentiometer 86 exactly offsets the increase in the voltage output of differential transformer 64, pointer 48 will resume its neutral position and motor 22 will come to rest. As the flow rate through pipe 1 continues to rise to the value corresponding to the new reference input voltage, motor 22 will be operated periodically and will gradually move valve plunger 17 and wiper 89 back to their neutral positions. When the new flow rate is attained, the voltage across terminals 46 and 47 will be zero, pointer 48, valve plunger 17 and wiper 89 will be in their neutral positions, and motor 3 will be hydraulically locked. Core 68 of differential transformer 64 will, of course, be in a new position in which the feedback output of this device just balances the increased reference input. It should be realized that since the speed at which valve 2 moves toward its new position decreases as it approaches that position, hunting is eliminated, or at least minimized.

From the preceding discussion, it should be apparent that the operator can establish a lower rate of flow through pipe 1 by moving wiper 57 of potentiometer 55 in the opposite direction to decrease the reference input voltage. In this case, motor 22 initially drives valve plunger 17 upward to pressurize and vent working chambers 5 and 4, respectively, and wiper 89 of potentiometer 86 is shifted in the opposite direction from neutral position to produce a voltage that opposes the output voltage of differential transformer 64. As in the first case, the speed at which valve 2 is being moved at any instant is proportional to the magnitude of the error signal at that time. When the reduced flow rate has been established, pointer 48, valve plunger 17 and wiper 89 again will have been returned to their neutral positions.

In the event the flow rate through pipe 1 changes as a result of a change in conditions in the fluid system with which it is connected, the controller will automatically move valve 2 in a direction to restore the set flow rate. Thus, if the system conditions cause the flow rate to rise above the value corresponding to the present reference input, diaphragm 69 will move core 68 upward and increase the output voltage from differential transformer 64. The resulting voltage unbalance across terminals 46 and 47 of the error detector 45 causes pointer 48 to swing to the left and uncover cell 52'. As explained above, this action causes motor 22 to drive valve plunger 17 upward to pressurize and vent working chambers 5 and 4, respectively. Motor 3 now commences to move valve 2 in the closing direction at a rate proportional the voltage unbalance across terminals 46 and 47. As motor 22 shifts pilot valve 8 it moves wiper 89 to rebalance the voltages across error detector 45, and as the flow rate through pipe 1 decreases in response to movement of valve 2, diaphragm 69 moves core 68 of differential transformer 64 back toward the set position dictated by the current value of the reference input voltage. As the rate of flow through the pipe 1 approaches the desired value, the speed of movement of valve 2 progressively decreases. When flow rate is again restored to the set value, pointer 48, valve plunger 17 and wiper 89 will have been returned to their neutral positions and core 68 of differential transformer 64 will have been returned to its original position.

It should be apparent that a decrease in flow rate resulting from a change in operating conditions in the fluid system will cause the controller to open valve 2 and restore the set valve. In this case also, the valve 2 always moves at a speed proportional to the error signal applied to error detector 45.

As stated previously, the drawing and description relate only to the preferred embodiment of the invention. Since changes can be made in the structure of this embodiment without departing from the inventive concept, the following claims should provide the sole measure of the scope of the invention.

What I claim is:

1. In combination
(a) first and second rectifier bridges, each having a first junction toward which current may flow through two arms, a second junction from which current may flow through two arms, and two other junctions;
(b) a reversible electric motor having first and second A.C. control circuits connected across said other two junctions of the first and second rectifier bridges, respectively, the first circuit being effective when closed to cause the motor to move in one direction and the second circuit being effective when closed to cause the motor to move in the opposite direction;
(c) an A.C. source connected with the motor;
(d) first and second controlled rectifiers, each controlled rectifier having an anode, a cathode and a gate electrode, the anode and cathode of the first controlled rectifier being connected with the first and second junctions, respectively, of the first rectifier bridge and the anode and cathode of the second controlled rectifier being connected with the first and second junctions, respectively, of the second rectifier bridge;
(e) first and second transformers, each having a primary winding and a center-tapped secondary winding, the center tap of the first transformer being connected with the gate electrode of the first controlled rectifier and the center tap of the second transformer being connected with the gate electrode of the second controlled rectifier;
(f) first means including a pair of rectifiers connecting the opposite ends of the secondary winding of the first transformer with the cathode of the first controlled rectifier;
(g) second means including a pair of rectifiers connecting the opposite ends of the secondary winding of the second transformer with the cathode of the second controlled rectifier; and
(h) means including the A.C. source for selectively energizing and de-energizing the primary windings of the two transformers.

2. A proportional speed floating controller comprising
(a) a final control member movable in opposite directions to vary a condition in reverse senses;
(b) operating means capable of being energized in opposite senses for moving the final control member in said opposite directions;
(c) controlling means, having a member movable in opposite directions from a neutral position, for energizing the operating means in said opposite senses, the rate at which the operating means moves the final control member being dependent upon the distance the movable member of the controlling means is shifted from its neutral position;
(d) an error-detecting circuit;
(e) means in said circuit for establishing a reference voltage;
(f) means in said circuit and responsive to said condition for establishing a second voltage proportional to the magnitude of the condition;
(g) means in said circuit and responsive to movement of the movable member of the controlling means for establishing a third voltage variable in magnitude with the position of said movable member and in polarity with the direction in which that member moves from said neutral position;
(h) means associated with said last mentioned means for varying the rate of change of magnitude of the third voltage in response to movement of the movable member of the controlling means;
(i) a reversible electric motor connected to drive the movable member of the controlling means;
(j) a motor actuating circuit connected with the motor and including switching means having one condition in which it causes the motor to move in one direction, and another condition in which it causes the motor to move in the opposite direction; and
(k) error detecting means in said error detecting circuit and connected with said switching means, the error-detecting means being responsive to the difference between the reference voltage and the algebraic sum of the second and third voltages for causing the switching means to assume that condition which will eliminate said difference.

3. In combination
(a) an error detector having a pair of terminals at opposite ends of a current flow path and means responsive to a voltage difference between said terminals;
(b) first and second D.C. power sources capable of supplying variable voltages;
(c) a pair of first leads of like polarity, one connecting one side of the first source with one terminal of the error detector, and the other connecting the corresponding side of the second source with the other terminal of the error detector;
(d) a second lead interconnecting the remaining sides of the two sources and defining therewith a common path;

(e) a resistor connected between each terminal of the error detector and the common path; and (f) one-way current flow means in each first lead and preventing current flow in a direction opposite to that established by the associated source.

4. A proportional speed floating controller as defined in a claim 2 in which (a) the means for establishing a reference voltage comprises a D.C. power source of constant voltage, and a first potentiometer connected across the source;

(b) the means for establishing said second voltage comprises an A.C. power source, a differential transformer connected with the A.C. source and having a movable core, means responsive to said condition for positioning said core, and a rectifier bridge for converting the output of the differential transformer into a D.C. voltage;

(c) the means for establishing said third voltage comprises a transformer connected with said A.C. source and having a center tapped secondary, a second potentiometer connected across said secondary and having a wiper connected to be shifted by the movable member of the controlling means, and a pair of reversely set rectifiers in the connections between the potentiometer and the secondary; and (d) the error-detecting circuit includes a first lead connecting the wiper of the first potentiometer with the error detector, a second lead connecting the positive output junction of the rectifier bridge with the error detector through the second potentiometer, a third lead connecting the negative side of the D.C. source with the negative output junction of the rectifier bridge and defining therewith a return path, a pair of resistors connected between the first and second leads, respectively, and the return path, a pair of voltmeters connected across the outputs of the first potentiometer and the rectifier bridge, respectively, and a rectifier in each of the first and second leads located between the connections with the associated voltmeter and resistor and preventing current flow from the error detector toward the voltmeter connection.

5. A proportional speed floating controller as defined in claim 4 in which the error detector comprises (a) a galvanometer having a pair of terminals connected with the first and second leads, respectively, and a member movable in opposite directions from a neutral position in response to current flow in opposite directions through the galvanometer;

(b) a pair of photosensitive cells connected with said switching means and effective alternately to cause the switching means to assume one or the other of said conditions; and (c) means for reversely energizing the photosensitive cells including a light source and a light shield carried by the movable member of the galvanometer, the light shield preventing illumination of either cell when said member is in neutral position and permitting progressive illumination of one or the other of the cells when the member moves away from that position.

6. A proportional speed floating controller as defined in claim 5 in which the means for varying the rate of change of magnitude of the third voltage in response to movement of the movable member of the controlling means comprises a variable resistance interposed in the connection between the primary of the third voltage-establishing means and the A.C. source.

References Cited by the Examiner
UNITED STATES PATENTS

| | | | |
|---|---|---|---|
| 2,577,696 | 12/1951 | Abbott et al. | 318—29 |
| 3,106,675 | 10/1963 | Riebs et al. | 318—208 |
| 3,171,070 | 2/1965 | List et al. | 318—481 X |
| 3,183,425 | 5/1965 | Slawson | 318—227 |

JOHN F. COUCH, *Primary Examiner.*